UNITED STATES PATENT OFFICE.

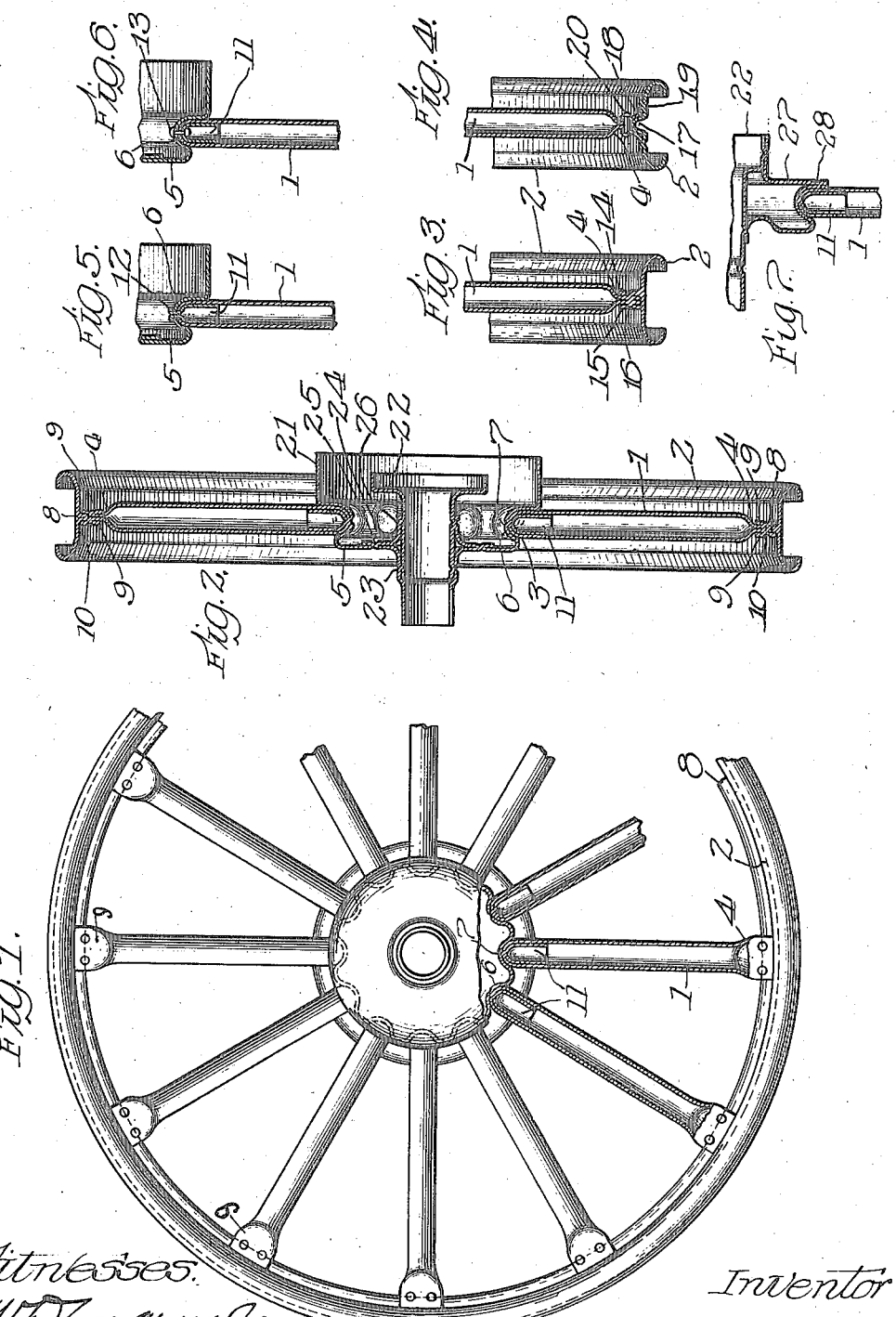

WILLIAM ERASTUS WILLIAMS, OF CHICAGO, ILLINOIS.

TUBULAR SPOKED WHEEL.

1,248,585.              Specification of Letters Patent.          Patented Dec. 4, 1917.

Application filed December 15, 1914. Serial No. 877,427.

*To all whom it may concern:*

Be it known that I, WILLIAM ERASTUS WILLIAMS, a citizen of the United States, residing in Chicago, in the county of Cook and the State of Illinois, have invented a new and useful Improvement in Tubular Spoked Wheels, as set forth in the annexed specification.

The object of my invention is to produce a cheaply constructed, strong, and durable spoked wheel having tubes for spokes.

The invention is set forth in the claims.

Reference will be had to the accompanying drawing, in which Figure 1 is an elevation of a wheel with parts broken away and parts in section.

Fig. 2 is a central cross sectional elevation.

Figs. 3 and 4 show modified forms of the spoke and rim fastening.

Figs. 5, 6 and 7 show modified forms of the spoke and hub fastening.

In the drawing, 1 indicates the tubular spokes and 2 the rim of the wheel.

I prefer to make the spokes 1 by drawing them up out of flat sheets by several operations, somewhat after the manner of forming cartridge shells, forming a tube having one end closed which in the drawing is indicated as 3. However, I may make my tube in long sections by ordinary means and then cut off spoke lengths and then by suitable dies close over one end of each spoke arriving at a similar formation, but having small cold shut apertures at one end. Before I close the other ends 4, of the tubular spokes by flattening the ends as I have indicated, I fasten them into the hub. To add to the strength of this fastening, I force into the end of the tube a thimble 11 of metal thicker than the body of the tube itself.

I make the hub out of suitable cast or die-shaped metal having the main body piece 5 forming the central shell into which I preferably emboss pockets 6 shaped to fit the preferably rounded ends of the spokes. Before any additions or parts are affixed to the hub which would prevent access to the inside of the shell of the hub, or the interior surfaces of the pockets 6, I fasten the tubular spoke pieces to the hub by spot welds 7. In making welds 7 I insert a copper rod for the electrode through the open end of the spoke, forming the inside electrode and the other electrode is inserted from the back or open side of body or shell piece 5.

After the welds 7 are all made, securing the spokes firmly into the hub, I then flatten the ends of the spokes as is indicated by 4 and trim the ends to fit the inside edge of the flange 8, Figs. 1 and 2, and then I apply two small clip pieces 9 and weld them by spot welds 10 through the junction line of the flattened ends of my spokes with the edge of the flange 8. Thus the welds themselves make a tight closure of the spokes with the rim.

In place of welding the spokes to the hub as is indicated by 7, Fig. 2, I may make the thimbles 11, Fig. 5, with projections that will extend through holes that will be punched in the hub at the location of the spot welds 7 and the ends of the thimbles 11 may be bent over and riveted like an eyelet rivet as is indicated by 12.

In place of the other two means of fastening the spokes to the hub, I may rivet them as is indicated by the rivets 13 Fig. 6. In either case the access required to the inside of the tubular spokes in making the fastening to the hub, will be had before the other ends of the spokes have been flattened as indicated.

In Fig. 2, I show two clips 9 one on each side on the ends of the spokes. In Fig. 3, I make the flange 14 of the rim of sufficient depth and on the right location on the rim to allow the spokes to lap over it and use only one clip 15 and weld through it the spokes and the flange as is indicated by 16.

I may make my rim of flat metal and roll a rib for stiffness in the central portion as is indicated by 17 Fig. 4 and on each side thereof, I may use the clips 18 and spot weld them to the rim as is indicated by 19 and rivet them to the spoke ends as is indicated by 20.

When desired, the hub may be formed with a brake band shell shown at 21, Fig. 2, as integral with the main portion 5 of the hub. In this case, a distinct tubular shell 22 is forced into the portion 5 and secured by welding as indicated at 23. An annular flanged member, angular in cross section, fits against the shell 5 and around the adjacent part of the shell or tube 22 and is welded to both at 25, 26. This construction gives a strong rigid hub although the metal be very light.

On front wheel constructions where a brake band drum is not fastened, it may be desirable to use a hub construction shown in Fig.

7 having the flanged plate 27 which will be welded at 28 to the back flange of the shell 5.

While I prefer to form the inner ends of the spokes as shown and correspondingly recess the hub, this is not indispensable, the essential point being that the end of the hollow spoke should fit the surface of the hub and be rigidly fixed thereto.

What I claim is:

1. In a hub of the character described, the combination with an axial tube, of an annular concentric member, of materially greater diameter, peripherally adapted to receive spokes, and two bracing members rigidly connecting said concentric member to the exterior of said tube at widely separated points on the exterior of said tube, substantially as set forth.

2. A hub of thin ductile metal having at one end a small axial tubular portion and at the opposite end a second, larger, concentric tubular portion connected at its inner end, by a flange, with the inner end of the first mentioned tubular portion, a tube forming an extension of the first mentioned portion and extending into the second portion, and a flanged collar fitting on the extension tube and laterally supporting the flange first mentioned; all the primarily distinct members being rigidly fixed to all the others which they meet.

3. A metal hub having a tubular axial portion, a concentric annular portion, of materially greater diameter, adapted to receive the ends of spokes spaced around its periphery, a web rigidly connecting said annular portion to a part of said tube at one side of the plane of the spokes, and a flange rigidly connecting the medial portion of said web to a part of the tube at some distance from the part first mentioned.

4. A wheel having a hub shell of thin ductile metal and tubular spokes with closed inner ends with their terminal faces rigidly fixed to the periphery of the hub.

5. A wheel having tubular spokes suitably fastened into the hub and secured to the rim by clips embracing both sides of the ends of the spokes and secured both through the spoke ends and to the rim.

6. A wheel consisting of a suitable hub, tubular spokes closed at their inner ends and provided with curved terminal faces fixed to the periphery of the hub and with outer end portions flattened for a short distance, and a suitable rim rigidly fixed to said flattened portions.

7. A tubular spoked wheel having spokes closed at one end in a rounded hemispherical form, reinforcing thimbles on the inside of the spokes and having their ends fitting the ends of the spokes said thimbles and spokes secured to the hub section by welding together the contacting portions of the hub, spoke and thimble.

Signed at Chicago, in the State of Illinois, and county of Cook this 25th day of November 1914.

WILLIAM ERASTUS WILLIAMS.

Witnesses:
H. A. FORSBERG,
EUGENE S. COOPER.